United States Patent
Essabar

(10) Patent No.: US 7,822,390 B2
(45) Date of Patent: Oct. 26, 2010

(54) SYSTEM FOR TRANSMITTING AND RECEIVING DATA WIRELESSLY

(75) Inventor: Mohamad Essabar, Smørum (DK)

(73) Assignee: Oticon A/S, Smorum (DK)

( * ) Notice: Subject to any disclaimer, the term of this patent is extended or adjusted under 35 U.S.C. 154(b) by 1139 days.

(21) Appl. No.: 11/485,431

(22) Filed: Jul. 13, 2006

(65) Prior Publication Data

US 2007/0041601 A1  Feb. 22, 2007

(30) Foreign Application Priority Data

Aug. 22, 2005 (EP) .................................. 05107693

(51) Int. Cl.
    *H04B 1/40* (2006.01)
(52) U.S. Cl. .................... 455/87; 455/341; 343/841
(58) Field of Classification Search ............... 455/341, 455/274, 82, 87; 343/841, 850, 860, 731, 343/895, 701
    See application file for complete search history.

(56) References Cited

U.S. PATENT DOCUMENTS 4,712,112 A * 12/1987 Carr ........................ 343/788

2005/0110700 A1 * 5/2005 Terry ........................ 343/841
2005/0111682 A1   5/2005 Essabar et al.
2007/0013595 A1 * 1/2007 Hart et al. .................... 343/742

FOREIGN PATENT DOCUMENTS

EP   1 107 472 A2   6/2001

* cited by examiner

Primary Examiner—Lana N Le
Assistant Examiner—Ping Y Hsieh
(74) Attorney, Agent, or Firm—Birch, Stewart, Kolasch & Birch, LLP

(57) ABSTRACT

This invention relates to a system (100) for communicating wirelessly. The system (100) comprises an inductive antenna circuit (110) for transmitting and receiving inductively coupled signals, a driving means (102, 104) connected to inductive antenna circuit (110) and driving the inductive antenna circuit (102, 104) during a transmit mode, and comprises an amplifier means (112) connected to the inductive antenna circuit (110) and detecting and amplifying received signals differentially a receiving mode.

8 Claims, 2 Drawing Sheets

SYSTEM FOR TRANSMITTING AND RECEIVING DATA WIRELESSLY

FIELD OF INVENTION

This invention relates to a system for wireless communication between for example a remote controller and a hearing aid such as a behind-the-ear (BTE), an in-the-ear (ITE), an in-the-canal (ITC) or a completely-in-canal (CIC), or an implanted hearing aid.

BACKGROUND OF INVENTION

Transmit/receive switching means in hearing aids, such as disclosed in American patent application no.: US 2005/111682, are used for providing switching between transmit and receive modes in hearing aids for wireless communication. This American patent application describes a system wherein an inductive coil operating as an antenna is switched between an equivalent series resonant circuit reducing inductive load in transmit mode and an equivalent parallel resonant circuit increasing inductive load in the receive mode. The system further utilises a transmit/receive-switch to establish a voltage protection during the transmit mode of a low noise amplifier (LNA) used for amplifying received data during the receive mode.

Despite the advances achieved within the hearing aid technology by the above described transmit-receive switching means there still is a need for providing improvements of the noise rejection during receive mode, improvements of the voltage protective elements, and provide means for switching between transmit and receive mode without changing the antenna matching.

SUMMARY OF THE INVENTION

An object of the present invention is to provide a system for providing wireless communication with an improved noise rejection.

It is a further object of the present invention to provide a hearing aid comprising a system for wireless communication between a hearing aid and a remote controller as well as binaurally between a set of hearing aids.

A particular advantage of the present invention is the provision of a simple protection of a low noise amplifier amplifying the received communication.

Another advantage is the provision of transmit/receive switching without loss of performance.

The above objects and advantages together with numerous other objects, advantages and features, which will become evident from below detailed description, are obtained according to a first aspect of the present invention by a system for communicating wirelessly and comprising an inductive antenna circuit adapted to transmit and receive inductively coupled signals and having a first and second set of terminals, a driving means connected to said first set of terminals and adapted to drive said inductive antenna circuit during a transmit mode, an amplifier means connected to said second set of terminals and adapted to detect and amplify an incoming differential signal during a receiving mode.

The system according to the first aspect achieves a common mode rejection of signals electrically coupled to the two antenna terminals. Hence the amplifier means coupled as a differential amplifier ensures a significantly improved noise reduction scheme.

The system according to the first aspect of the present invention further may comprise a current sensing means interconnecting said second set of terminals with a non-inverting input and an inverting input of said amplifier means. The current sensing means may comprise a low input impedance buffer having current to voltage conversion capabilities. The low input impedance buffer may convert a sensed current to a voltage for the inverting and non-inverting input of the amplifier means. Hence the problems inheritably associated with prior art switching between a transmitting and receiving mode are avoided, namely problems relating to the amplifier means being exposed to damaging high voltages induced by the inductive antenna circuit during the transmit mode and disturbance of the resonance frequency of the inductive antenna circuit by stray and blocking capacitances or any other protective elements.

The low impedance buffer according to the first aspect of the present invention may comprise a common base coupled transistor. Thus the impedance buffer effectively may convert the current generated in the inductive antenna circuit to a voltage to be amplified by the amplifier means.

The driving means according to the first aspect of the present invention may comprise a first power output presenting a square wave to a first terminal of said first set of terminals and a second power output presenting an inverted square wave to a second terminal of said first set of terminals. Hence the inductive antenna circuit advantageously is presented with a square wave alternating between a positive and negative maximum, which enables a differential voltage signal to be transmitted as well as received and differentially amplified by the amplifier means.

The inductive antenna circuit according to the first aspect of the present invention may comprise a series connection of tuning capacitors on either side of a transmit/receive inductor between said first and second set of terminals. Hence the first and second set of terminals are connected together and therefore no switching between components is required when changing from transmit to receive mode.

Additionally, or alternatively, the inductive antenna circuit may comprise a series connection of transmit/receive inductors on either side of a tuning capacitor between said first and second set of terminals. This series connection provides a well defined zero point between the first and second set of terminals, and provides, as the above mentioned series connection, an inductive antenna solution which does not require switching between components when changing from transmit to receive mode.

The inductive antenna circuit according to the first aspect of the present invention may alternatively comprise a first series connection of tuning capacitors on either side of a transmit inductor between said first set of terminals, or a first series connection of transmit inductors on either side of a tuning capacitor between said first set of terminals. The inductive antenna circuit may further comprise a second series connection of tuning capacitors on either side of a receive inductor between said second set of terminals, or a second series connection of receive inductors on either side of a tuning capacitor between said second set of terminals.

The inductive antenna circuit according to the first aspect of the present invention may further comprise a magnetic coupling core. The magnetic coupling core advantageously increases the magnetic flux permeability and therefore the transmit inductor and the receive inductor are capable of being reduced in size. This obviously is particularly advantageous for implementation of the system according to the first aspect in a hearing aid.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawing, wherein.

DETAILED DESCRIPTION OF PREFERRED EMBODIMENTS

In the following description of the various embodiments, reference is made to the accompanying figures, which show by way of illustration how the invention may be practiced. It is to be understood that other embodiments may be utilized and structural and functional modifications may be made without departing from the scope of the present invention.

Figure 1:
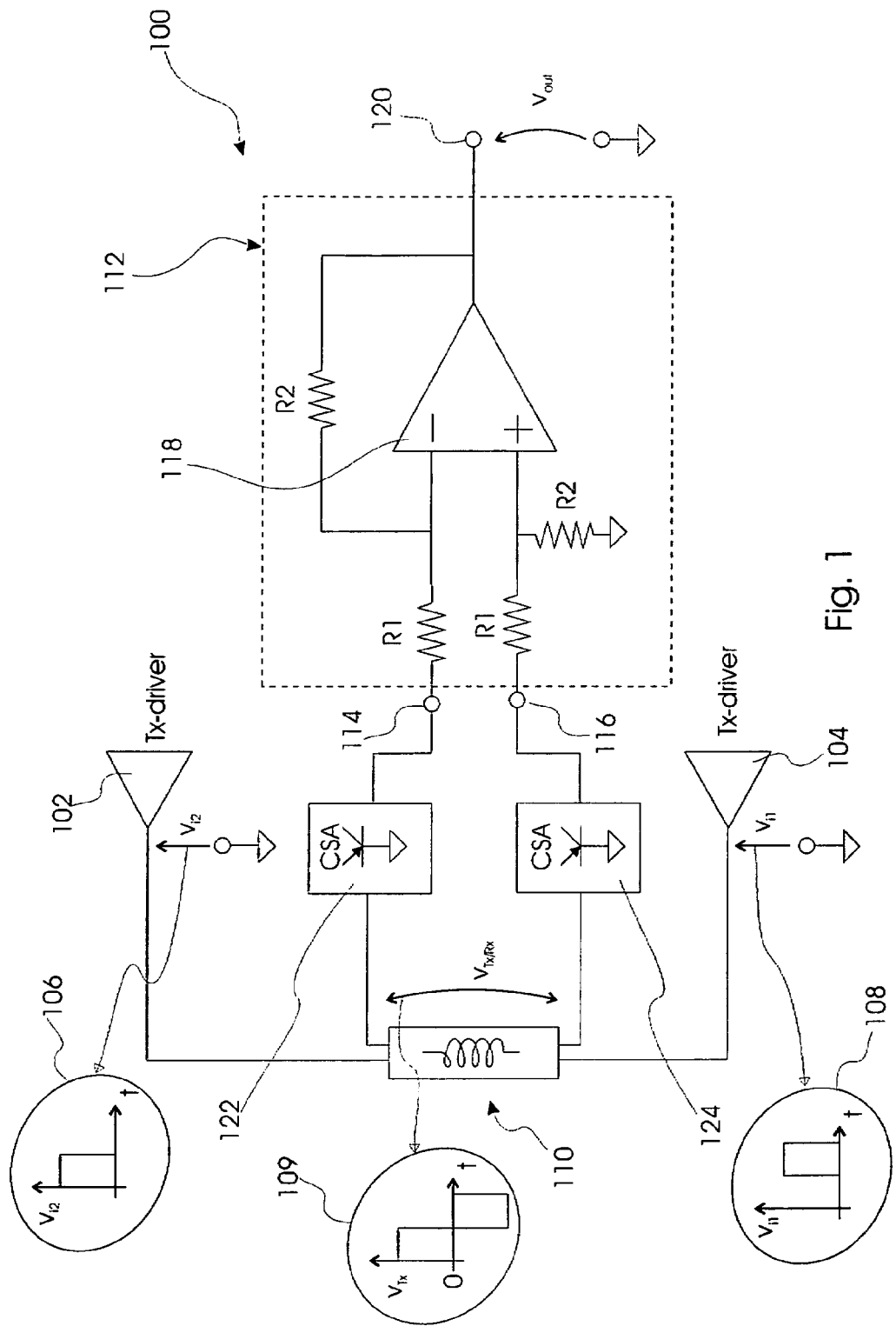
FIG. 1, shows a system for communicating wirelessly according to a first embodiment of the present invention.

FIG. 1, shows a system for communicating wirelessly, which is designated in entirety by reference numeral 100. The system 100 comprises a set of drivers 102, 104 operating 180° out of phase in transmit mode, shown in graphical representations 106, 108, respectively, so as to establish a square wave transmit signal across a transmit/receive antenna 110, which alternates between a positive maximum and negative minimum, shown in graphical representation 109.

In transmit mode the transmit/receive antenna is driven as a full bridge class D transmitter. That is, enveloping the transmit data in pulse width of the square wave transmit signal. In an alternative embodiment the transmit/receive antenna is driven as a half bridge class D. The square wave transmit signal may be coded in accordance with any protocol known to a person skilled in the art including any proprietary protocols.

The system 100 further comprises a low noise amplifier 112 receiving the received signal across a first 114 and second 116 input port. The low noise amplifier 112 comprises a differentially coupled operational amplifier 118 amplifying the voltage difference between the first 114 and second 116 input ports and providing an amplified difference signal on output port 120. In this context the term "amplified" should be construed as an amplification range from unity to 1000, such as 10 or 100, which amplification obviously is controlled by the value of resistances R1 and R2. It should be understood that this difference amplifier circuit may be implemented in any configurations known to a person skilled in the art.

The system 100 further comprises current sensing amplifiers 122, 124 interconnecting the end terminals of the transmit/receive antenna 110 and the input ports 114, 116 of the low noise amplifier 120. The current sensing amplifiers 122, 124 in the first embodiment of the present invention comprises a low input impedance buffer, such as a common base transistor configuration, for transforming current input signals from the transmit/receive antenna 110 to output voltage signals, which are forwarded to the input ports 114, 116.

The low input impedance implementation of the current sensing amplifiers 122, 124 further ensures that the resonance frequency of the transmit/receive antenna 110 is not significantly disturbed by the complex imaginary part of the input impedance.

Figure 2:
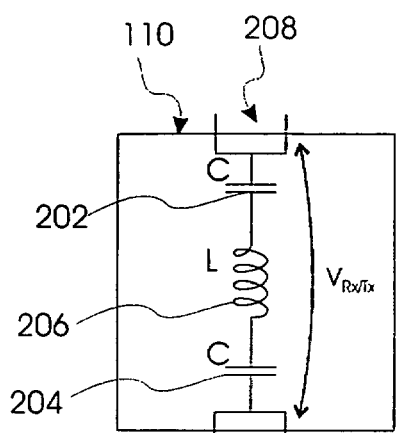
FIG. 2, shows an inductive antenna circuit according to the first embodiment of the present invention.

FIG. 2, shows an inductive antenna circuit 110 according to first embodiment of the present invention, which comprises a series connection of tuning capacitors 202, 204 on either side of a transmit/receive inductor 206 between end terminals 208, 210. The end terminal 208 is connected to driver 102 and current sensing amplifier 122, and end terminal 210 is connected to driver 104 and current sensing amplifier 124. The inductor may be an air coil or a wounded on a ferrite material core.

Figure 3:
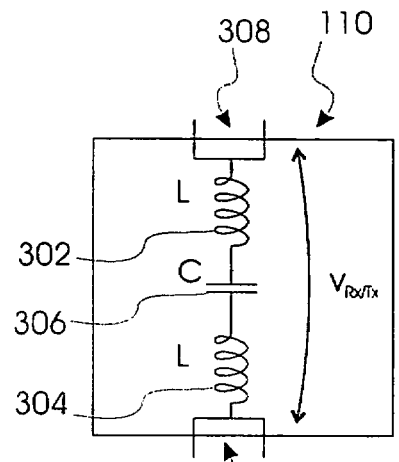
FIG. 3, shows an inductive antenna circuit according to a second embodiment of the present invention.

FIG. 3, shows an inductive antenna circuit 110 according to second embodiment of the present invention, which comprises a series connection of transmit/receive inductors 302, 304 on either side of a tuning capacitor 306 between end terminals 308, 310. The end terminal 308 is connected to driver 102 and current sensing amplifier 122, and end terminal 310 is connected to driver 104 and current sensing amplifier 124. The two inductors may be air coils or both inductors wound on a single or two separate ferrite material cores.

Figure 4:
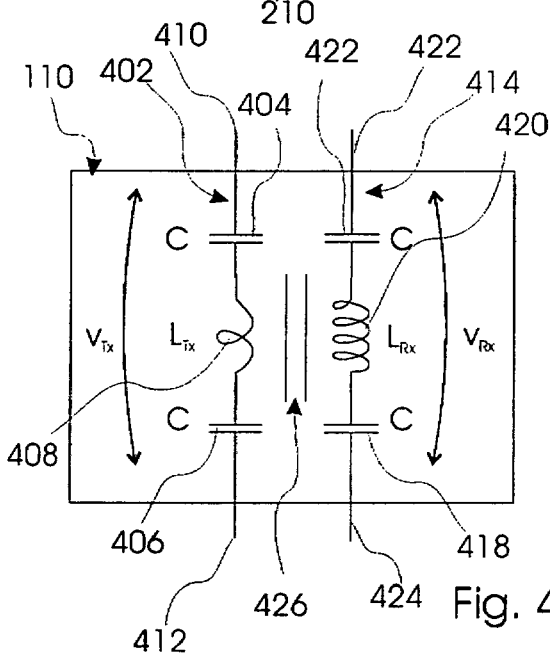
FIG. 4, shows an inductive antenna circuit according to a third embodiment of the present invention.

FIG. 4, shows an inductive antenna circuit 110 according to a third embodiment of the present invention, which comprises a first series connection 402 of tuning capacitors 404, 406 on either side of a transmit inductor 408 between end terminals 410, 412. The end terminals 410, 412 are connected to drivers 102 and 104.

The inductive antenna circuit 110 according to the third embodiment of the present invention further comprises a second series connection 414 of tuning capacitors 416, 418 on either side of a receive inductor 420 between end terminals 422, 424. The end terminals 422, 424 are connected to current sensing amplifiers 122 and 124.

The inductive antenna circuit 110 according to the third embodiment of the present invention further comprises a magnetic core 426 for supporting the windings of the transmit inductor 408 and the receive inductor 420.

Figure 5:
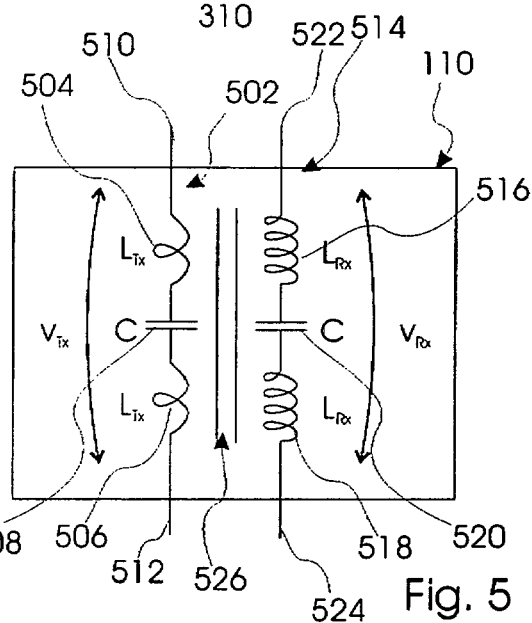
FIG. 5, shows an inductive antenna circuit according to a fourth embodiment of the present invention.

FIG. 5, shows an inductive antenna circuit 110 according to a fourth embodiment of the present invention, which comprises a first series connection 502 of transmit inductors 504, 506 on either side of a tuning capacitor 508 between end terminals 510, 512. The end terminals 510, 512 are connected to drivers 102 and 104.

The inductive antenna circuit 110 according to the fourth embodiment of the present invention further comprises a second series connection 514 of receive inductors 516, 518 on either side of a tuning capacitor 520 between end terminals 522, 524. The end terminals 522, 524 are connected to current sensing amplifiers 122 and 124.

The inductive antenna circuit 110 according to the fourth embodiment of the present invention further comprises a magnetic core 526 for supporting the windings of the transmit inductors 504, 506 and the receive inductors 516, 518.

The invention claimed is:

1. An inductive antenna circuit, comprising:
   a first set of terminals;
   a second set of terminals;
   a driving unit connected to said first set of terminals and configured to drive said inductive antenna circuit during a transmit mode;
   an amplifier connected to said second set of terminals and configured to detect and amplify an incoming differential signal during a receiving mode;

a first tuning capacitor connected in series to a first terminal of a first inductor wound around a core, the first tuning capacitor further connected to one terminal of the first set of terminals;

a second tuning capacitor connected in series to a second terminal of the first inductor, the second tuning capacitor further connected to another terminal of the first set of terminals;

a third tuning capacitor connected in series to a first terminal of a second inductor wound around said core, the third tuning capacitor further connected to one terminal of the second set of terminals; and a fourth tuning capacitor connected in series to a second terminal of the second inductor, the fourth tuning capacitor further connected to another terminal of the second set of terminals.

2. An inductive antenna circuit, comprising:

a first set of terminals;

a second set of terminals;

a driving unit connected to said first set of terminals and configured to drive said inductive antenna circuit during a transmit mode;

an amplifier connected to said second set of terminals and configured to detect and amplify an incoming differential signal during a receiving mode;

a first transmitting inductor wound around a core and connected in series to a first terminal of a first tuning capacitor, the first transmitting inductor further connected to one terminal of the first set of terminals;

a second transmitting inductor wound around the core and connected in series to a second terminal of the first tuning capacitor, the second transmitting inductor further connected to another terminal of the first set of terminals;

a first receiving inductor wound around the core and connected in series to a first terminal of a second tuning capacitor, the first receiving inductor further connected to one terminal of the second set of terminals; and a second receiving inductor wound around the core and connected in series to a second terminal of the second tuning capacitor, the second receiving inductor further connected to another terminal of the second set of terminals.

3. The inductive antenna circuit according to any of claims 1 or 2, further comprising a current sensor interconnecting said second set of terminals with a non-inverting input and an inverting input of said amplifier.

4. The inductive antenna circuit according to claim 3, wherein said current sensor comprises a low input impedance buffer having current to voltage conversion capabilities.

5. The inductive antenna circuit according to claim 4, wherein said low impedance buffer comprises a common base coupled transistor.

6. The inductive antenna circuit according to any of claims 1 or 2, wherein said driving unit comprises a first power output presenting a square wave to a first terminal of said first set of terminals and a second power output presenting an inverted square wave to a second terminal of said first set of terminals.

7. The inductive antenna circuit according to any of claims 1 or 2, wherein said inductive antenna circuit further comprises a second series connection of receive inductors on either side of a tuning capacitor between said second set of terminals.

8. The inductive antenna circuit according to any of claims 1 or 2, wherein said inductive antenna circuit further comprises a magnetic coupling core.

* * * * *